(12) United States Patent
Caselli et al.

(10) Patent No.: US 12,366,074 B2
(45) Date of Patent: *Jul. 22, 2025

(54) FLOOR ELEMENT FOR FORMING A FLOOR COVERING, A FLOOR COVERING, AND A METHOD FOR MANUFACTURING A FLOOR ELEMENT

(71) Applicant: Dal-Tile, LLC, Dallas, TX (US)

(72) Inventors: Claudio Caselli, Dallas, TX (US); Rahul Patki, Richardson, TX (US)

(73) Assignee: Dal-Tile, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,567

(22) Filed: May 29, 2024

(65) Prior Publication Data

US 2024/0309655 A1  Sep. 19, 2024

Related U.S. Application Data

(63) Continuation of application No. 17/997,570, filed as application No. PCT/US2021/029051 on Apr. 26,
(Continued)

(51) Int. Cl.
*E04F 15/10* (2006.01)
*B32B 3/06* (2006.01)
(Continued)

(52) U.S. Cl.
CPC ............... *E04F 15/107* (2013.01); *B32B 3/06* (2013.01); *B32B 3/30* (2013.01); *B32B 7/12* (2013.01);
(Continued)

(58) Field of Classification Search
CPC ................ E04F 15/082; E04F 15/0215; E04F 15/02038; E04F 2201/023; E04F 2201/042; E04F 2201/043; B32B 2471/00
See application file for complete search history.

(56) References Cited

U.S. PATENT DOCUMENTS 3,050,493 A  8/1962  Wagner et al.
3,239,981 A  3/1966  Fitzgerald
(Continued)

FOREIGN PATENT DOCUMENTS

CN   1256200 A    6/2000
CN   205000580 U  1/2016
(Continued)

OTHER PUBLICATIONS

Gil, L., "Cork Composites: A Review," Materials, 2009, 2, pp. 776-789.
(Continued)

*Primary Examiner* — Patrick J Maestri
(74) *Attorney, Agent, or Firm* — Troutman Pepper Locke LLP; James E. Schutz; Chris N. Davis

(57) ABSTRACT

A floor element for forming a floor covering, the floor element comprising a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element and wherein the resin material comprises a modulus of elasticity greater than 0.1 GPa, preferably greater than 0.5 GPa, even more preferably greater than 1 GPa.

18 Claims, 2 Drawing Sheets

Related U.S. Application Data 2021, now Pat. No. 12,018,495, which is a continuation of application No. 16/868,744, filed on May 7, 2020, now Pat. No. 11,359,386.

(51) Int. Cl.

| | | |
|---|---|---|
| *B32B 3/30* | (2006.01) | |
| *B32B 7/12* | (2006.01) | |
| *B32B 9/00* | (2006.01) | |
| *B32B 9/04* | (2006.01) | |
| *B32B 27/08* | (2006.01) | |
| *B32B 27/20* | (2006.01) | |
| *B32B 27/30* | (2006.01) | |
| *B32B 27/36* | (2006.01) | |
| *B32B 27/38* | (2006.01) | |
| *E04F 15/02* | (2006.01) | |

(52) U.S. Cl.
CPC .............. *B32B 9/005* (2013.01); *B32B 9/045* (2013.01); *B32B 27/08* (2013.01); *B32B 27/20* (2013.01); *B32B 27/304* (2013.01); *B32B 27/36* (2013.01); *B32B 27/38* (2013.01); *E04F 15/02038* (2013.01); *E04F 15/105* (2013.01); *B32B 2260/02* (2013.01); *B32B 2260/046* (2013.01); *B32B 2264/10* (2013.01); *B32B 2307/51* (2013.01); *B32B 2307/536* (2013.01); *B32B 2307/54* (2013.01); *B32B 2307/732* (2013.01); *B32B 2419/04* (2013.01); *B32B 2471/00* (2013.01); *E04F 2201/023* (2013.01); *E04F 2201/043* (2013.01)

(56) References Cited

U.S. PATENT DOCUMENTS

| | | | |
|---|---|---|---|
| 3,521,418 | A | 7/1970 | Bartoloni |
| 3,646,180 | A | 2/1972 | Winnick |
| 3,817,012 | A | 6/1974 | Wack et al. |
| 4,415,616 | A | 11/1983 | Angioletti |
| 4,567,704 | A | 2/1986 | Bernett et al. |
| 4,681,786 | A | 7/1987 | Brown |
| 4,832,995 | A | 5/1989 | McLauchlin |
| 6,818,275 | B2 | 11/2004 | Guarda et al. |
| 7,393,583 | B1 | 7/2008 | Warren |
| 9,896,581 | B2 | 2/2018 | Morizur |
| 9,896,851 | B1 | 2/2018 | Collins |
| 10,563,411 | B2 | 2/2020 | Patki et al. |
| 2008/0092473 | A1 | 4/2008 | Heyns |
| 2008/0184646 | A1 | 8/2008 | Alford et al. |
| 2009/0155612 | A1 | 6/2009 | Pervan et al. |
| 2010/0018133 | A1 | 1/2010 | Boyadjian et al. |
| 2010/0154339 | A1 | 6/2010 | Paganelli |
| 2010/0229481 | A1 | 9/2010 | Wallin |
| 2012/0100332 | A1 | 4/2012 | Yu et al. |
| 2014/0349084 | A1 | 11/2014 | Patki et al. |
| 2016/0288447 | A1 | 10/2016 | Cordeiro |
| 2020/0011071 | A1 | 1/2020 | Patki et al. |

FOREIGN PATENT DOCUMENTS

| | | |
|---|---|---|
| CN | 110607893 A | 12/2019 |
| CN | 110662877 A | 1/2020 |
| EP | 2369090 B1 | 9/2011 |
| EP | 2832798 A1 | 2/2015 |
| EP | 3404165 A1 | 11/2018 |
| JP | 2003239517 A | 8/2003 |
| JP | 2012026260 A | 2/2012 |
| KR | 20110064350 A | 6/2011 |
| WO | 2004097141 A2 | 11/2004 |
| WO | 2005/100679 A1 | 10/2005 |
| WO | 2009142365 A | 11/2009 |
| WO | 2010072704 A1 | 7/2010 |
| WO | 2011150076 A1 | 12/2011 |
| WO | 2017013501 | 1/2017 |
| WO | 2008097860 A2 | 8/2018 |
| WO | 2018211397 A1 | 11/2018 |
| WO | 2020172003 A | 8/2020 |

OTHER PUBLICATIONS

Oprea, S., "Effects of Fillers on Polyurethane Resin-Based Polyurethane Elastomeric Bearing Materials for Passive Isolation," Journal of Composite Materials, 42, pp. 2673-2685.
International Search Report and Written Opinion for International (PCT) Application No. PCT/US2019/040083 mailed Sep. 18, 2019.
International Search Report and Written Opinion for PCT Application No. PCT/US2021/029051 mailed Jul. 22, 2021.

FLOOR ELEMENT FOR FORMING A FLOOR COVERING, A FLOOR COVERING, AND A METHOD FOR MANUFACTURING A FLOOR ELEMENT

CROSS-REFERENCE TO RELATED APPLICATIONS

This application is a continuation of U.S. patent application Ser. No. 17/997,570 filed 31 Oct. 2022, which is a National Stage Entry of, and claims priority to, PCT Patent Application No. PCT/US2021/029051 filed on 26 Apr. 2021, which claims the benefit of U.S. patent application Ser. No. 16/868,744, filed on 7 May 2020, now issued as U.S. Pat. No. 11,359,386 on 14 Jun. 2022, the entire contents of each of which are herein incorporated by reference.

BACKGROUND

1. Field

The present invention relates to a floor element for forming a floor covering, a floor covering, and a method for manufacturing a floor element.

More particularly, the invention is related to a floor element for forming a floor covering, wherein this floor element comprises a decorative layer made of a brittle material such as natural stone, glass or sintered ceramic materials like porcelain, earthenware or the like. The decorative layer can, for example, be a ceramic tile.

2. Background

Traditionally, ceramic tiles are installed by laying them side by side on a surface such as a floor or wall. Typically, an adhesive compound is used to attach the tiles to the surface. Seams between the tiles are grouted. In this way, the tiles are bonded to a rigid surface, for example a concrete subfloor, thereby improving their impact strength. The bound with the subfloor, and thus also with the structure of the dwelling, also leads to a high attenuation of walking sounds, both in the room where the floor is installed, and in quarters below the respective room. The tiled surface is water impervious and hygienic, since it can be cleaned in a very wet manner. The step of installing the tiles with an adhesive is, however, labor intensive and represents a significant portion of the labor involved in a typical floor covering installation. Moreover, this installing technique requires a high professional competence in order to obtain a well levelled floor covering. Thus, due to the time and labor involved in the installation, it is typically quite costly to have tiles professionally installed.

To substitute an existing floor covering made of tiles, it is often necessary to break the tiles, regenerate the surface by removing the residues of adhesive and then install a new floor covering. Thus, the demolition of a floor covering made of tiles is a labor and time-consuming operation. If the aim of the restoration is to substitute only one or a few damaged tiles, this operation becomes also difficult, since the substitution of one tile preferably does not damage the adjacent tiles.

In recent years, manufacturers have attempted to produce do-it-yourself tiling solutions that are easier to install. Some examples of these attempts are shown in WO 2004/097141 and WO 2008/097860. The floor elements disclosed in those documents can be laid on a surface and mechanically coupled together to form a floor covering without the use of an adhesive, thereby reducing the labor and time of the installing phase. Such kind of floor covering is known as a floating floor covering. In particular, in these documents, a ceramic tile or natural stone slab is fixed to a support layer that comprises coupling elements configured to realize a coupling with coupling elements of an adjacent floor element, thereby forming a floor covering.

On the other hand, since such floor elements are not bonded to a common rigid surface, the impact strength and, consequently, the fatigue strength is significantly reduced. The floating installation may also give rise to louder walking noise. The joints between the tiles of WO 2008/097860 may be prone to water penetration especially upon wet cleaning. According to some embodiments of WO 2004/097141, grout may be applied in the joints available between adjacent floor elements, which may lead to water imperviousness of the respective joint.

To improve the impact resistance of ceramic tiles, US 2014/349084 suggests a tile with a composite build-up. In this composite tile, a reinforcing layer is arranged in between two ceramic layers or in between a ceramic layer and a polymer laminate. As example of a reinforcing layer, a fiberglass layer is mentioned. The installation of this tile is, however, still cumbersome. A bonding with an underlying subfloor is required, for example via a bottom layer with pressure sensitive adhesive or tack fast loop fabric so that the tile is substantially made solid with the subfloor for improving the impact strength. Moreover, a precise positioning of the tile is difficult.

WO 2010/072704 proposes a different type of reinforcing layer, namely a steel plate. This steel plate is adhered to the back surface of the ceramic tile or slab. Also here, the installation is, however, difficult. The installation is done by simply resting the tiles on a subfloor, so that a precise positioning of the tile is difficult and the floor covering results in a not well levelled surface and in a noisy and permeable floor covering.

The present invention aims in the first place to provide an alternative floor element, which, in accordance with several of its preferred embodiments, is directed to solve one or more of the problems arising in the state of the art.

BRIEF SUMMARY OF THE INVENTION

In one aspect, the invention provides a floor element for forming a floor covering, the floor element comprising a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element, and wherein the resin material has a modulus of elasticity greater than 0.1 GPa, preferably greater than 0.5 GPa, even more preferably greater than 1 GPa.

In another aspect, the invention provides a floor element for forming a floor covering, the floor element comprising a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element, and wherein the resin material has an elongation at break below 200%, more preferably below 150%, even more preferably below 100%, for example below 50%; and/or an elongation at break above 1%, preferably above 10%.

In another aspect, the invention provides a floor element for forming a floor covering, the floor element comprising a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element, and wherein the support layer comprises a material that has a flexural modulus greater than 5 GPa and/or a flexural strength between 20 and 90 MPa.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION OF THE INVENTION

Figure 1:
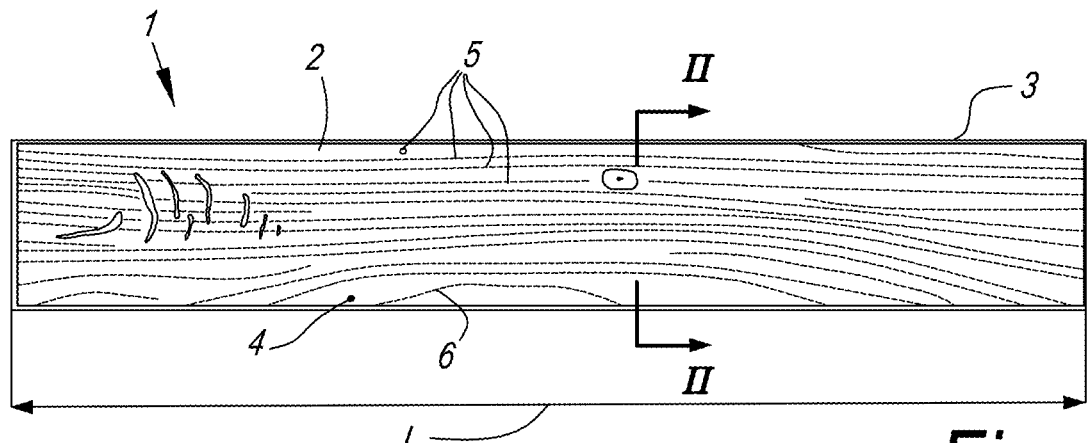
FIG. 1 shows a top view of an embodiment of a floor element of the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Thereto, the present invention, according to a first independent aspect, relates to a floor element for forming a floor covering, wherein this floor element comprises a decorative layer comprising a ceramic material, an intermediate layer comprising a resin, and a support layer arranged below this decorative layer, wherein the support layer comprises edges provided with coupling elements configured to realize a mechanical coupling with coupling elements of an adjacent floor element. With the characteristic that the resin comprises a modulus of elasticity, or stiffness, greater than 0.1 GPa, preferably greater than 0.5 GPa, more preferably greater than 1 GPa. The inventors have, found that resin with such a modulus of elasticity (also called modulus of Young or stiffness) provides a sufficiently rigid intermediate layer between the support and the decorative layer that can efficiently transfer and/or absorb impact energy acting on the decorative layer thereby improving the resistance of the decorative layer itself. The inventors have found that, due to this solution, the impact resistance of the floor element, more particularly of the decorative layer of ceramic, is highly increased, so that, even with the mechanical locking between such floor elements, the impact strength achieves or even exceeds the impact strength of the traditional elements installed by means of adhesives. Moreover, with the claimed solution it is possible to improve the impact resistance of the floor element without the necessity to add further rigid or resilient reinforcing elements like rubber layer, fiberglass or metal plates.

Impact strength for flooring can be determined by means of a steel ball impact test. According to this test the impact strength is measured by dropping a steel ball on the floor element from a certain height, if the floor element does not break the height is increased until a height is reached where the steel ball breaks the floor element. The steel ball has a weight of 225.5 grams and a diameter of 38.1 mm (1.5 inches). The impact strength is expressed in terms of the maximum attainable height from which the steel ball, when dropped on the floor element does not break the floor element. The higher the drop height, the higher is the impact strength. The impact strength can be expressed in Joule (J), i.e. the energy of the steel ball when hitting the surface of the floor element. The inventors have found that traditional floorings, for example floorings made of porcelain floor elements with a thickness of approximately 10 mm, directly glued to a subfloor, usually show impact strength comprised between 1.68 J and 2.25 J (corresponding to a ball falling from a height comprised between 762 and 1016 mm)

whereas known floating floors show an impact strength usually lower than 1.12 J (corresponding to a ball falling from a height lower than 508 mm). The inventors have found that, due to this solution, an impact strength above 5.62 J (corresponding to a fall of the steel ball from a height of above 2540 mm) can be achieved.

Fatigue strength for flooring is determined by means of the so-called Robinson Test according to ASTM C627. According to this test a three-wheel cart rotates about its center on top of a sample section of a tiles floor. Above each wheel is a rod along which weights can be stacked. A power motor drives the assembly and the cart rotates at a rate of 15 revolutions per minute. The test is run according to a loading schedule with 14 different cycles. For each cycle, the schedule specifies a type of wheel to be used (soft rubber, hard rubber, or steel), the amount of weight to be stacked above each wheel, and the total number of cart revolutions to be executed. After the completion of each cycle, the sample floor section is visually examined. The test result qualifies the floor according to the number of cycles passed without failure and indicates the following service level to which the floor is destined:

Sample completing cycles 1 through 3 without failure: "Residential" rating;
Samples completing cycles 1 through 6: "Light" commercial rating;
Samples completing cycles 1 through 10: "Moderate" commercial rating;
Samples completing cycles 1 through 12: "Heavy" commercial rating;
Samples completing all 14 cycles without failure are assigned in "Extra heavy" commercial rating. The inventors have found that due to the use of the intermediate layer according to the invention, the Robinson Test can result in passing 6 cycles (Light Commercial) as minimum.

According to a preferred embodiment of the invention, the resin material permeates a lower surface of the decorative layer. In fact, the resin permeating the lower surface of the decorative layer substantially improves the transmission and dissipation of the impact stress through the floor element so that a lower portion of said energy is absorbed by the decorative layer, further improving the impact resistance thereof. Moreover, the resin constitutes a hinder to the propagation of cracks in the decorative layer itself. Furthermore, in case of superficial cracks of the decorative layer, the intermediate layer keeps the decorative layer itself coherent, and preferably compacted, thereby disguising the visual appearance of the superficial cracks. In practice, when the resin permeates the pores of the decorative layer it substantially forms a "composite polymer-ceramic layer" that significantly improves the impact strength of the floor element.

The resin of the intermediate layer can be a thermosetting resin or thermoplastic resin. Examples of thermosetting resin are epoxy, polyurethane, cyanoacrylate or acrylic resin. Examples of thermoplastic resin are hot melt, polyester thermoplastic, vinyl etc. Preferably the resin is a rigid resin. In fact, the inventors have found that a rigid resin, rather than flexible resin, improves the transfer of the impact energy between the layers. In particular, according to a preferred embodiment of the invention the intermediate layer comprises an epoxy resin. It is also preferred that the epoxy is a bicomponent resin, i.e. a thermosetting resin obtained by curing at low temperature (for example at room temperature) a mixture of two components, namely a resin and a hardener. When the two components of the resin are mixed together the curing reaction starts so that it is not necessary to activate the cure by providing external energy, like heat, UV or EB radiation. Said external energy could be optionally provided in order to accelerate the curing process. It is to be noted that epoxy has found to show a good adhesion behavior with ceramic material so that it enhances the reinforcing effect of the resin.

According to a preferred aspect of the invention the resin comprises a viscosity at 20° C. less than 1000 mPas, preferably less than 800 mPas, more preferably less than 600 mPas, for example approximately 400 mPas. Values of viscosity expressed in the present application are referred to dynamic viscosity and can be measure with torsional rheometer like, for example those of Anton Paar Physica MCR series. Within the scope of the invention, viscosity means the viscosity of the uncured resin, for example the viscosity of the mixture of the two components before the completion of the curing, i.e. during the so-called pot life. In fact, the inventors have found that if the resin is sufficiently fluid, during its application onto the back of the decorative layer, it can permeate the pores thereof, thereby extremely improving the bonding between the intermediate layer and the decorative layer. It is noted that, according to a preferred solution the resin is in a substantially liquid state during the manufacturing process of the floor element. It is also possible that the resin is in a pasty or gel state during the manufacturing process, for example showing a thixotropic behavior in order to reach a sufficient fluidity to permeate the pores of the decorative layer under predetermined process conditions, for example during a pressing step.

The resin preferably comprises a tensile strength between 50 and 90 MPa, more preferably between 60 and 80 MPa, for example 75 MPa. It is noted that the resin preferably comprises a compressive strength between 90 and 130 MPa, more preferably between 100 and 120 MPa, for example 110 MPa. The inventors have found that such strength is sufficient to provide a rigid matrix for the composite polymer-ceramic layer that allows dissipation of the impact energy. It is also noted that the resin may preferably show a hardness value of at least 50 measured on a Shore D scale.

It is also preferable that the resin may comprise an elongation at break less than 200%, more preferably less than 150%, even more preferably less than 100%, for example less than 50%. Preferably said elongation at break of the resin may be greater than 1%, preferably greater than 10%. The inventors have found that a resin with a low elongation at break is to brittle to provide any effect to the impact strength of the decorative layer. On the other hand, it has been surprisingly found that resins that are too ductile, i.e. resins with an elongation at break above certain values do not provide sufficient strength to the decorative layer, since they do not effectively transfer the stress from the decorative layer to the support layer.

In a preferred embodiment of the invention the intermediate layer may be an adhesive layer that bonds the decorative layer and the support layer together. In practice, according to a preferred embodiment the intermediate layer has the double function of bonding together the layers of the covering element and reinforcing the decorative layer. In this case there may be no need of further reinforcing or adhesive layers so that the covering element result in a thinner, and easily manufacturable product. According to an alternative embodiment of the invention the intermediate layer may comprise two or more different resins. For example, the intermediate layer may comprise a first resin for impregnating the pores of the decorative layer and a second resin for bonding together the decorative layer and the support layer. According to said embodiment the first resin may be a rigid resin for reinforcing the decorative layer and the second resin may be a for example a soft or elastomeric resin that provides a cushioning effect in case of impact, or a glue that does not have any influence on the mechanical properties of the decorative layer.

The inventors have also found that preferably the resin may comprise a filler content less than 20% weight, more preferably less than 10% weight, even more preferably less than 1% weight, for example it can be free from fillers, like mineral fillers. In fact, the inventors have found that the presence of fillers can on one hand improve mechanical properties of the resin, but the other hand can increase the viscosity of the resin thereby forming an obstacle to the permeation of the decorative layer. For example, said intermediate layer can be constituted by said resin.

Preferably the resin may also show a shrinkage, after curing, comprised between 0.5 and 15% for example between 1 and 10%. The inventors have surprisingly found that a resin showing this characteristic during its curing retires significantly. Since during curing the resin is the only component of the floor element that shrinks, it compresses the decorative layer disposed above thereby reinforcing the decorative layer itself. This effect can be further enhanced if the resin permeates the lower surface of the decorative layer. In fact, if the resin of the intermediate layer permeates the lower surface of the decorative layer the strong bonding within the two layers helps the compressive action of the resin. Moreover, this reinforcing mechanism due to the compressive action of the resin may join the reinforcing action due to the filling of the pores and the improved stress transfer mechanism toward the board. It is possible to visibly notice the compression of the decorative layer by measuring the bending of the decorative layer before and after curing the resin. If after curing the decorative layer is bent, it is compressed. Therefore, according to a preferred embodiment, after gluing, the board comprises a planarity deviation less than 1.5 mm, preferably less than 1 mm, more preferably less than 0.8 mm. Within the context of the present application, the planarity deviation is defined as the height difference between the extremal portion and the central portion of an edge of the board.

Preferably the resin covers at least a portion of the lower surface of the decorative layer, for example the majority, i.e. at least 50 percent, of the lower surface of said decorative layer. More preferably the resin covers 80 percent or more of the lower surface of the decorative layer, for example it covers the 100 percent of the lower surface of the decorative layer so that the effect of distribution and dissipation of the impact energy is obtained for an impact occurring in any point of the decorative layer.

The resin is preferably provided onto the lower surface of the decorative layer in an amount greater than 150 g/sqm, more preferably greater than 200 g/sqm, for example 220 g/sqm so that the resin is in an amount that is sufficient to fully permeate the open pores of the lower surface of the decorative layer.

It is also preferable that the resin is provided in an amount sufficient to overflow from the open porosity of the decorative layer in order to act as a glue for the support layer. In other words, it is preferable that the resin partially permeates the open porosity of the decorative layer and partially coats the lower surface thereof for forming the intermediate layer and improving the transfer of energy. Said effect of transfer of energy is further improved if the support layer is directly fixed to the intermediate layer and, in particular, to said portion of the resin that coats the lower surface of the decorative layer, so that the intermediate layer acts as an adhesive layer that bonds together the decorative layer and the support layer.

In accordance with a most preferred embodiment of the invention, the decorative layer comprises a ceramic body, for example made of porcelain, red body ceramic, stoneware, earthenware, or other sintered ceramic powders. Preferably, the decorative layer is a ceramic tile or slab. The term "ceramic tile" refers to a substantially flat body consisting of baked minerals, such as clay, and preferably with a fired decorative top surface, preferably but not necessarily, on the basis of a glaze. The glaze has also the effect of preventing the resin permeating the decorative layer from reaching the upper surface of the decorative layer thereby affecting the appearance of the floor element.

It is noted, however, that this first aspect can be advantageously applied with decorative layers being made of any kind of material showing an open porosity at least in correspondence of its lower surface. Examples of said material can be brittle material, such as natural stone, concrete, glass or glass-ceramic material. The term "brittle material" refers to a material that breaks without significant plastic deformation. In particular, for the scope of said patent application, the term "brittle material" refers to a material that of its own (if not bonded to a support layer and without any reinforcing element) has an impact strength lower than 1.68 J (corresponding to a ball falling from a height lower than 762 mm) according to the ball impact test.

According to a preferred aspect of the invention the decorative layer may comprise, at least in correspondence of its lower surface, an open porosity adapted to allow the resin to permeate the decorative layer itself. In fact, as already indicated above the inventors have surprisingly found that by making the resin of the intermediate layer permeating the pores of the decorative layer it is possible to significantly improve the transfer of the impact energy. Thus, according to a preferred embodiment of the invention the decorative layer comprises an apparent porosity between 0.1% and 10% determined according to ASTM C373, more preferably between 2% and 8%, for example 6%. The abovementioned ranges and values of apparent porosity provide the optimum balance between intrinsic mechanical properties of the decorative layer and the resin permeability thereof thereby optimizing the impact strength. In fact, the pores of the material, especially the closed pores that cannot be permeated by the resin may represent weak points of the material itself, therefore it is preferable that the decorative layer comprises an apparent porosity less than 15%, preferably less than 10% measured according to ASTM C373. Furthermore, the decorative layer may preferably have a volume of the open pores comprised between 0.01 cc (cubic centimeter) and 1 cc, more preferably between 0.10 cc and 0.90 cc, for example 0.60 cc. In this way the pores are big enough to be filled by the resin while at the same time they are sufficiently small to avoid compromising the mechanical properties of the decorative layer. This result is particularly impressive since the apparent porosity range is specific for ceramic tiles that are used mainly for wall covering or for floor covering in residential installations, but for floor covering of commercial installations where the traffic is more intense and higher mechanical properties are required, it is preferred the use of ceramic tiles having lower apparent porosity.

Thus, according to a first preferred possibility the decorative layer is made of porcelain. Porcelain is a ceramic material obtained by firing at high temperature, for example around 1200° C., a mixture of relatively pure raw material comprising clays, kaolin, quartz, feldspar, calcium carbonate and/or other mineral raw materials. Porcelain shows a very low apparent porosity, preferably below 1%, for example 0.3% measured according to ASTM C373. Porcelain has a volume of the open pores comprised between 0.01 cc (cubic centimeter) and 0.1 cc, more preferably between 0.1 cc and 0.6 cc. Said porosity values are such that the porcelain material shows relatively high mechanical properties that can be further increased due to the resin permeating the decorative layer. In fact, a porcelain tile as such, i.e. when not bonded to a support layer and without the resin permeating the decorative layer, shows an impact resistance of 0.73 J, whereas a floor element comprising a decorative layer made of porcelain bonded above a support layer by means of an intermediate layer comprising a resin that permeates the lower surface of the decorative layer can reach an impact resistance up to 3.37 J.

Therefore, according to a second preferred possibility the decorative layer is made of a red body ceramic tile. Red body ceramic is a ceramic material obtained by firing at high temperature, for example around 1150° C., of a raw material mixture comprising clays, kaolin, quartz, feldspar, calcium carbonate and/or other mineral raw materials. Red body ceramic may be fired at lower temperature with respect to porcelain thereby showing a higher porosity and water absorption rate. Moreover, red body ceramic is obtainable starting from a raw material mixture that is cheaper than the raw material mixture that is necessary to obtain porcelain. For example, red body ceramic may comprise an apparent porosity comprised between below 10%, preferably between 2% and 8%, for example 6% measured according to ASTM C373. Red body ceramic may have a volume of the open pores comprised between 0.10 cc and 0.90 cc, for example 0.60 cc. Usually a red body ceramic tile as such, i.e. when not bonded to a support layer and without the resin permeating the decorative layer, shows an impact resistance of 0.67 J, whereas a floor element comprising a decorative layer made of red body ceramic bonded above a support layer by means of an intermediate layer comprising a resin that permeates the lower surface of the decorative layer can reach an impact resistance up to 5.62 J. It is to be noted that a red body ceramic tile as such has an impact resistance lower than a porcelain tile as such, whereas a floor element according to the invention and comprising red body ceramic shows a significantly higher resistance than a floor element comprising porcelain.

The inventors have found that the interaction between the resin and the decorative layer is improved if the decorative layer comprises a lower surface that is substantially flat. The lower surface is the non-visible surface (in use) that is opposite to the upper decorative surface of the decorative layer. Usually, the lower surface of a ceramic tile comprises a back structure, generally formed by ribs or excavations, that can have a thickness in case of ribs, or depth in case of excavations, up to 1 or 2 mm. According to a first possibility for forming the decorative layer, the decorative layer itself is free from said back structure. In a second preferred possibility for forming said decorative layer preferred embodiment said back structure can comprise ribs having a thickness, or excavations having a depth, less than 6 mm, preferably less than 0.4 mm. Said back structure can comprise ribs having a thickness, or excavations having a depth greater than 0.1 mm. According to this second possibility the back structure prevents overflow of the resin beyond the edges of the decorative layer. Moreover, in case of a back structure comprising excavations, it is possible to prevent the above-mentioned overflow while, at the same time, maximizing the contact surface between the decorative edge and the support layer. In a preferred embodiment the back structure comprises a plurality of excavations disposed according to a pattern having lines substantially running into a longitudinal direction of the decorative layer, for example said lines can be straight lines, curved or having a zigzag shape or of any other shape, moreover said lines can be continuous or dashed.

Furthermore, according to a preferred embodiment of the invention the lower surface of the decorative layer, in particular of the ceramic tile, is free from backwash. The backwash is a thin coating basically comprising an engobe that is applied, often non uniformly, to the lower surface of the ceramic tile and has the function of preventing the material of the non-fired ceramic tile from sticking onto the rollers of the firing kiln. Since the backwash comprises an engobe that is at least partially composed by a glass composition, during firing of the ceramic tile it melts permeating the pores of the ceramic tile that are open on the lower surface thereof so that the lower surface itself becomes impermeable. Thus, the inventors have found that a decorative layer made of a ceramic tile having a lower surface free from backwash provides a better resin permeability of the lower surface of the ceramic tile. It is also possible that the backwash covers a portion of the lower surface of the decorative layer that is less than 40%, preferably less than 20% of said lower surface. In this way the backwash does not totally impermeabilize the lower surface allowing the resin to permeate said porosity of the decorative layer, while on the other hand helps the manufacturing of the decorative layer preventing the material of the non-fired ceramic tile from sticking onto the rollers of the firing kiln.

The decorative layer has an upper face comprising a décor. The décor can be provided with a variety of textures, designs, and colors. In a preferred embodiment, the décor simulates a natural product, such as natural stone or wood. Preferably, the décor is at least partially formed by a print. The print is preferably realized by means of digital printing, such as inkjet printing, although screen printing, rotogravure, flexography, or off-set printing is not excluded. According to a variant, the décor is at least partially formed by uniformly colored base material or by a mix of colored base materials.

The decorative layer can comprise a background coating covering at least partially its upper surface and adapted to receive the décor on its top, for example adapted to receive the print on its top. The background coating can be white, beige, brown or of any color suitable to receive a décor on its top. In the case that the decorative layer is made of a ceramic material, the background layer preferably comprises at least a glaze covering the upper surface of the ceramic body.

The decorative layer can also comprise a protective coating covering at least partially its upper surface and being adapted to be placed above the décor. The protective coating can be transparent or translucent. It is clear that the protective coating can be used in combination with the background coating. In the case that the decorative layer is made of a ceramic material, the protective layer preferably is a glaze.

Preferably, the decorative layer has a thickness comprised between 4 and 15 mm, preferably between 6 and 12 mm, more preferably greater than 7 mm, for example 8 or 10 mm. The inventors have found that by adding an intermediate layer a satisfying fatigue behavior can be achieved for a relatively thin decorative layer. Moreover, it is to be noted that said preferred values of thicknesses permit to find a good balance between weight and cost of the material on side, and mechanical resistance on the other side. Generally speaking, to higher thicknesses correspond higher weight, higher cost but also higher mechanical resistance. Due to the reinforcing effect provided by the resin permeating the lower surface of the decorative layer it is possible to reduce the thickness of the decorative layer itself. The rigidity of the decorative layer restrains the thermal expansion of the support layer, and that this restraining effect is enhanced as the thickness of the decorative layer increases.

It is noted that the decorative layer may comprise density as expressed by surface weight of at least 10 kg/sqm, preferably 15 kg/sqm, for example greater than 19 kg/sqm. High density of the decorative layer may improve installation of the floor covering and in particular a vertical locking of between the floor elements as it will be described below in more detail. It is also preferred that the decorative layer comprises a density as expressed by surface weight of less than 35 kg/sqm, preferably less than 30 kg/sqm, for example less than 25 kg/sqm. In fact, an excessively heavy decorative layer may affect the maneuverability of the floor element as well as complicating the packaging and the transportation thereof.

The decorative layer can be made of any shape, for example a squared, rectangular or hexagonal shape. In a preferred embodiment, the floor elements are rectangular and oblong in shape, and are preferably provided with a wood grain print depicting wood grain lines extending globally in the longitudinal direction of the rectangular decorative layer. The covering element may further comprise any dimension, although it is preferred that it comprises a superficial area of less than 1.5 sqm, preferably less than 1 sqm, more preferably less than 0.4 sqm.

The support layer is preferably made of a material adapted to be provided with coupling elements and/or made of a waterproof material and/or made of a compressible material. According to a preferred embodiment, the support layer is made of a polymeric material. Polymeric materials have good mechanical properties in combination with relative low cost and low weight and, further, they provide for an impermeable and a sound reducing board.

Preferably, the support layer is made of a thermoplastic polymeric material, preferably with a glass transition temperature (Tg) less than 100° C., for example of PVC (polyvinyl chloride) or polyurethane, more particularly thermoplastic polyurethane. Examples of thermoplastic material are PVC, polyethylene, polypropylene, polyethylene terephthalate. Forming the support layer out of a material with a relatively low glass transition temperature leads to a support layer which is easily compressed at room temperature. Compression is desirable in many respects. For example, a possible thermal expansion of the support layer may be partially or wholly suppressed by the more rigid or stiffer decorative layer and/or reinforcing element that holds the material of the support layer in its original dimension. Compression is also interesting for the design of the coupling elements and allows for a certain adaptation to unevenness of the subfloor, which in its turn prevents air chambers in between the support layer and the subfloor that may amplify walking noises. Compression is also preferable for floor element having a significant planarity deviation since the coupling elements can more easily adapt each other in case of differences in heights.

Among thermoplastic materials PVC is a preferred choice for the support layer due to the balance between processability, physical and mechanical properties and cost.

The support layer can be made either of a flexible or, preferably, of a rigid PVC, wherein rigid PVC comprises an amount of plasticizer lower than 15 phr, and flexible PVC comprises an amount of plasticizer of 15 phr or higher, preferably more than 20 or more than 25 phr. Within the context of the present description, "rigid" means that the board, taken alone, bends under the own weight thereof less than 10 cm per meter and still better less than 5 cm per meter, whereas the "flexible" means that the board, taken alone, bends under the own weight thereof more than 10 cm per meter. The support layer may also comprise a high amount of filler materials, such as minerals, for example chalk, talc, calcium carbonate, silica, e.g. more than 30 wt % or more than 60% wt of such filler materials. The fillers add weight to the support layer and make the support layer very effective in killing the transit of walking sound to lower quarters. The content of filler should be preferably limited to below 80 wt %, preferably below 75 wt % in order to avoid excessively increasing brittleness of the board. Rigid PVC provides for a support layer having good dimensional stability when exposed to variation of the temperature. In other words, the expansion of the board, when exposed to high temperature, is limited thereby providing a good stability of the floor. A support layer made of flexible PVC has a lower dimensional stability but is more easily compressed and therefore its tendency to expand could be suppressed at least to some extent by other components of the floor elements.

According to a preferred embodiment, the support layer is made of a material having a flexural modulus greater than 1.5 GPa, preferably greater than 3 GPa, more preferably greater than 5 GPa, for example, approximately 8 GPa. Said flexural modulus is preferably less than 15 GPa, more preferably less than 10 GPa. The support layer may also comprise a flexural strength between 20 and 90 MPa, for example between 30 and 50 MPa. In fact, inventors have found that the rigidity of the support layer helps absorbing the impact energy thereby improving the impact strength.

In a most preferred embodiment, the support layer is made of rigid thermoplastic material, preferably PVC, having a content of mineral filler, preferably comprising calcium carbonate, between 50% and 75% by weight. According to this preferred embodiment, the support layer is made of a material having a flexural modulus between 5 and 10 GPa, for example approximately 8 GPa. It is to be noted that floor elements made of rigid PVC (also known as SPC "solid polymer composite" or "stone polymer composite") on the market, have a flexural modulus between 1.5 and 3.5 GPa. The inventors have found that by increasing the filler content it is possible to make it stiffer, and they have also found that a stiffer support layer further increases the reinforcing mechanism provided by the resin through an improvement of the stress transfer mechanism. The inventors have also found that a more rigid support layer helps the resin in keeping the decorative layer in a compressive state thereby further reinforcing the decorative layer itself.

According to an embodiment of the invention the support layer can be designed in such a way to compensate to variations of shape and/or dimension due, for example, to variations of the temperature. For example, the support layer can be formed of a plurality of separated elements, for example strips, or can comprises transversal notches separating adjacent portions of the support layer thereby permitting the expansion of said portions without affecting the global stability of the floor.

Preferably, the support layer is made of a material that comprises a thermal expansion coefficient less than 85 µm/m per° C., preferably less than 60 µm/m per° C. for example 50 µm/m per° C. For example, thermal expansion coefficient of the support layer is comprised between 20 µm/m per° C. and 85 µm/m per° C., preferably between 40 µm/m per° C. 60

μm/m per° C. This is the case when the support layer is made of a rigid plastic, for example rigid PVC, or when it is made of a fiber cement or mineral material.

Furthermore, the support layer has preferably a thickness comprised between 3.2 and 6 mm, more preferably about 4 mm. For example, a preferred embodiment of the invention provides for a support layer made of rigid PVC and showing a thickness of 4 mm, thereby representing a good solution in terms of thermal stability, noise reduction, low weight, and low cost.

Although according to a preferred embodiment the support layer comprises of polymeric material, it is possible that according to alternative embodiments the support layer may comprise other materials. In fact, with the aim of the present invention the substrate may comprise any material suitable to be used as support layer in furniture, wall covering or floor panel. It is also preferable that the substrate is waterproof. For example, the substrate can comprise a cement-based material, or a mineral based material.

In the case of a cement-based material, the substrate may comprise a fiber containing cement board, for example portland cement board. The term "fiber containing cement support layer" refers to a support layer containing at least a cement and a fibrous material, bonded together, for example pressed together to form the board. The fibers can be for example polymeric fibers or natural fibers. The adhesion is preferably carried out under pressure either in a cold or warm condition.

In the case of a mineral-based material, the substrate may comprise a fiber containing mineral board. The term "fiber containing mineral support layer" refers to a support layer containing at least a mineral and a fibrous material, bonded together, for example pressed together to form the board. The mineral can comprise silica, calcium carbonate, gypsum and/or magnesium oxide. The fibers can be for example polymeric fibers or natural fibers, for example cellulose or wood fibers. The mineral-based material the substrate may comprise glass fibers, preferably non-woven fiberglass. The adhesion is preferably carried out under pressure either in either in a cold or warm condition.

In the case of a mineral-based material, the substrate may comprise a multilayer structure. For example, the substrate can comprise a plurality of sheets or layers of mineral-based material bonded together to form the substrate. Said sheets can have the same composition or, preferably, said sheets can have different compositions. For example, the substrate can comprise an upper sheet, a lower sheet and at least an intermediate sheet, wherein said upper sheet and said lower sheet can have substantially the same composition that is different from the composition of the intermediate sheet. For example, the upper and lower sheets can comprise fiberglass, and/or a higher amount of fiber, preferably natural fiber, with respect to the intermediate sheet. This solution provides for an engineered substrate having the desired mechanical and physical properties, in particular in term of thermal stability and rigidity, and a low cost due to an intermediate sheet having a cheaper composition. The multilayer structure can comprise a plurality of sheets having different physical and/or mechanical characteristics. For example, said sheets can have different density and/or porosity. In a preferred example, the substrate can comprise a lower and/or a top sheet with lower porosity and an intermediate sheet with higher porosity to provide waterproofness while the intermediate layer help in keeping a lower overall density of the substrate and reducing the cost of the substrate itself.

In the case of a mineral-based material, examples of magnesium oxide-based boards are inter alia magnesium oxychloride-based support layer (Sorel cement), magnesium oxysulfate-based support layer and magnesium sulfate-based.

In the case of a mineral-based material the substrate may show density for example between 0.85 g/cm$^3$ and 2 g/cm$^3$, for example between 0.85 g/cm$^3$ and 1.5 g/cm$^3$.

Cement-based materials and mineral-based materials provides the advantage of a low flammability. Moreover, said cement-based materials and mineral-based materials are rigid and show a limited thermal expansion. Said thermal expansion is in fact very similar to that of stone like material, therefore the floor covering result in a highly stable floor covering. The high rigidity of the cement-based material or mineral-based material provides an important contribution in the overall impact strength of the floor covering. Moreover, in particular the mineral-based material show a relatively low density, so that a floor covering resulting from the combination of a substrate made of mineral-based material and a decorative layer made of stone like material, like ceramic, provides a relatively light, and stable floor element.

As stated above the floor element comprises edges provided with coupling elements. Said coupling elements are such that in a connected state of two similar floor elements engage into each other to create a mechanical coupling between the respective edges, preferably resulting in a mechanical locking between said edges in vertical and/or one or more horizontal directions. Under "mechanical coupling", a coupling is to be understood that allows adjacent floor elements to be coupled to each other without the need for glue or the like. More specifically, in a coupled condition of two of said adjacent floor elements, the coupling elements cooperate and preferably form locking surfaces limiting the mutual movement of said floor elements in vertical and/or one or more horizontal directions.

As used herein, the terms "horizontal" and "vertical" are basically expressed regarding a floor covering installed on a surface which is considered to be horizontal in its general meaning. Thus, when used regarding a single floor element which is a substantially flat element provided with a main plane, the terms "horizontal" and "vertical" are to be considered respectively equivalent to the terms "parallel with respect to the main plane of the floor element/installed floor elements" and "perpendicular with respect to the main plane of the floor element/installed floor elements".

The coupling elements are configured to allow realizing a coupling by means of a movement of one floor element with respect to another adjacent floor element. Such movement may be a translational motion in a downward, e.g. vertical, direction, a translational motion in a horizontal direction, e.g. perpendicular to the edges or an angling motion around a horizontal axis parallel to the edges.

According to a preferred embodiment of the invention, the coupling elements can be disposed substantially along the whole length of the related edge, for example, substantially defining the related edge. According to an alternative embodiment, the coupling elements can be interrupted along the relative edge so that empty spaces are provided between subsequent portions of the coupling elements. In this way, in a coupled condition, said empty spaces can be at least partially filled by the grout to further improve the bonding between the grout and the floor elements thereby increasing the fatigue resistance of the floor covering.

In a preferred embodiment, the coupling elements are configured so that, in a coupled condition, the coupling is free from pretension so that the coupling is simplified, and a lower force needs to be exerted by the operator. That is to say that, in the coupled condition the coupling elements are in an undeformed condition. Moreover, also the coupling movement of the coupling element, i.e. the relative movement between the coupling elements that allows the mechanical coupling, occurs without deformation of the coupling elements. For example, in a most preferred embodiment a play is established between the coupling elements so that tiny movements between the coupling elements in a vertical and/or horizontal direction are admitted. For example, the dimension of the male part on a plane orthogonal to the respective edge is equal or slightly smaller than the dimension of the female part on the same plane. Preferably said play is greater than 0.01 mm and less than 0.15 mm, more preferably said play is comprised between 0.03 and 0.1 mm. It is also preferred the coupling elements are configured such that in a coupled condition an inoperative space is established between the coupling element, for example a vertical and/or a horizontal inoperative space. In particular, it is preferred that one coupling element is smaller than the other coupling element so that the relative movement for coupling the floor elements is definitely improved and it is made possible to couple coupling elements of edges lying on different planes.

According to a preferred embodiment, the male and the female parts can be basically shaped as a tongue and a groove. According to a preferred embodiment, the tongue comprises a horizontal extending lip and a downward projecting hump. In a preferred embodiment the horizontally extending lip has a section tapered toward its tip. As a consequence, in this embodiment, the groove has a horizontal recess, for receiving the lip of the tongue, and an upward oriented hollow portion, for receiving the hump of the tongue, so that tongue can be fitted into the groove.

In a preferred embodiment wherein the coupling elements are shaped as a tongue and a groove, the coupling element comprise one or more of the features described in application Ser. No. 16/278,560 which is hereby incorporated by reference.

Although the tongue and groove embodiment is a preferred one, it is possible that the coupling elements can be realized according to other embodiment. For example, the coupling element can be provided in the form of upward oriented hook-shaped element and downward oriented hook-shaped element for coupling following a vertical movement. Said coupling elements are described in application Ser. Nos. 16/028,745 and 16/278,560 which are hereby incorporated by reference.

Preferably, said coupling elements are at least partially, more preferably entirely, formed in said support layer.

In a coupled condition of two of said floor elements preferably an intermediate distance is available between the respective upper edges of adjacent floor elements. Preferably, the decorative layer is mounted on the support layer in such a way that when the floor elements are in a coupled condition said intermediate distance is available between the edges of adjacent decorative layers, while the edges of the underlying support layer are coupled to each other by means of the available coupling elements. In particular the support layer comprises a portion that extend beyond at least one edge, preferably more than one, more preferably all the edges of the decorative layer. For example, the support layer can extend beyond the edges of the decorative layer of a predetermined distance, preferably but not necessarily said distance is the same on all the edges, in this case said predetermined distance is the half of said intermediate distance. For example, said intermediate distance can be of at least 1.5 millimeters, for example around 3 millimeters.

Preferably said intermediate distance between the floor elements can be filled by a grout thereby providing an impermeable floor covering. Preferably a polymeric and/or cement-based grout is used. The grout may be a flexible or rigid grout. A flexible grout may be for example a silicone-based grout whereas a rigid grout may be for example an epoxy-based grout or cement-based grout. Epoxy-based, and silicone-based are example of polymeric grout, other examples of polymeric grout are polyurethane-based or acrylic-based grout.

In a preferred embodiment, the grout can show a compressive strength greater than 20 MPa, for example comprised between 24 and 60 MPa. Preferably, the grout can show an hardness Shore A greater than 70, for example between 80 and 90. An intermediate layer comprising a resin having an elongation at break below a predetermined value and/or a second predetermined value can improve the impact strength of the decorative layer forms an inventive concept irrespective from the modulus of elasticity of the resin itself.

Therefore, according to a second independent aspect, the invention relates to a floor element for forming a floor covering, wherein this floor element comprises a decorative layer, for example made of a ceramic material, and a support layer arranged below this decorative layer, wherein the support layer comprises edges provided with coupling elements configured to realize a mechanical coupling with coupling elements of an adjacent floor element and wherein the floor element comprises an intermediate layer having a resin material and wherein said wherein the resin material comprises: an elongation at break less than 200%, more preferably less than 150%, even more preferably less than 100%, for example less than 50%; and/or an elongation at break greater than 1%, preferably greater than 10%. The covering element according to said second independent aspect may comprise one or more of the features described in relation to the first independent aspect.

The fact that the resin comprises an elongation at break less than 200%, more preferably less than 150%, even more preferably less than 100%, for less than below 50% or that the elongation at break of the resin may be greater than 1%, preferably greater 10% forms an inventive idea irrespective from other features of the resin, in particular from the modulus of elasticity. Therefore, a second inventive aspect of the invention relates to a floor element for forming a floor covering, wherein this floor element comprises a decorative layer made of a ceramic material and a support layer arranged below this decorative layer, wherein the support layer comprises edges provided with coupling elements configured to realize a mechanical coupling with coupling elements of an adjacent floor element and wherein the floor element comprises an intermediate layer having a resin material and wherein said wherein the resin material comprises: an elongation at break less than 200%, more preferably less than 150%, even more preferably less than 100%, for less than below 50% or that the elongation at break of the resin may be greater than 1%, preferably greater 10%. The floor element according to the second independent aspect can comprise one or more of the features described in relation to the first independent aspect.

The fact that the resin the support layer is made of a material that comprises a flexural modulus greater than 5 GPa and/or a flexural strength between 20 and 90 MPa forms an inventive idea irrespective from other features of the resin, in particular from the modulus of elasticity. Therefore, a third inventive aspect of the invention relates to a floor element for forming a floor covering, wherein this floor element comprises a decorative layer made of a ceramic material and a support layer arranged below this decorative layer, wherein the support layer comprises edges provided with coupling elements configured to realize a mechanical coupling with coupling elements of an adjacent floor element and wherein the floor element comprises an intermediate layer having a resin material and wherein said wherein the support layer is made of a material that comprises a flexural modulus greater than 5 GPa and/or a flexural strength between 20 and 90 MPa. The floor element according to the third independent aspect can comprise one or more of the features described in relation to the first independent aspect.

Figure 2:
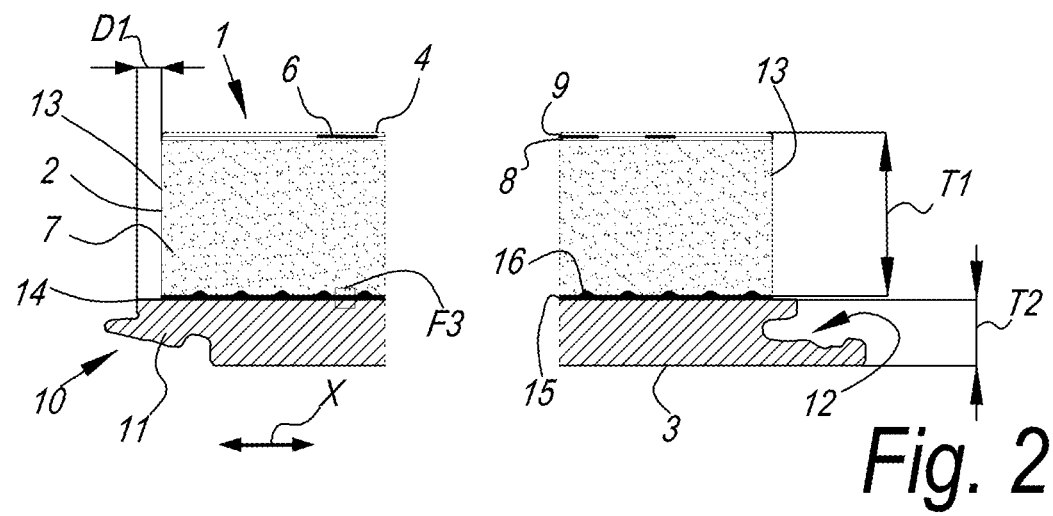
FIG. 2 on a larger scale shows a cross section along the line II-II of FIG. 1.
Figure 3:
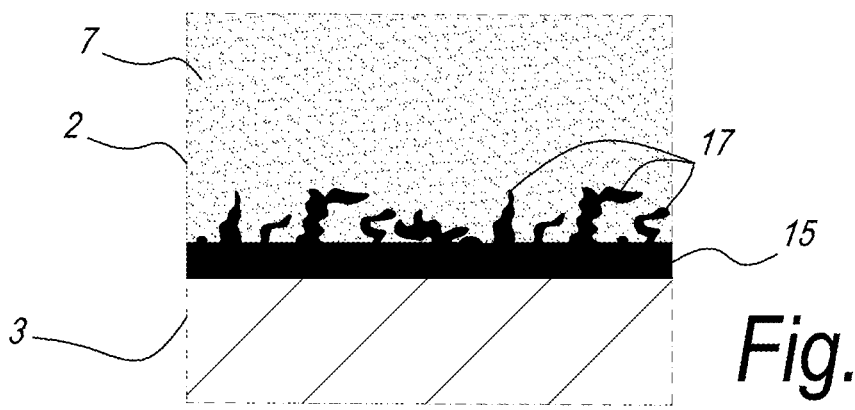
FIG. 3 on a larger scale shows a view on the area F3 indicated on FIG. 2.
Figure 4:
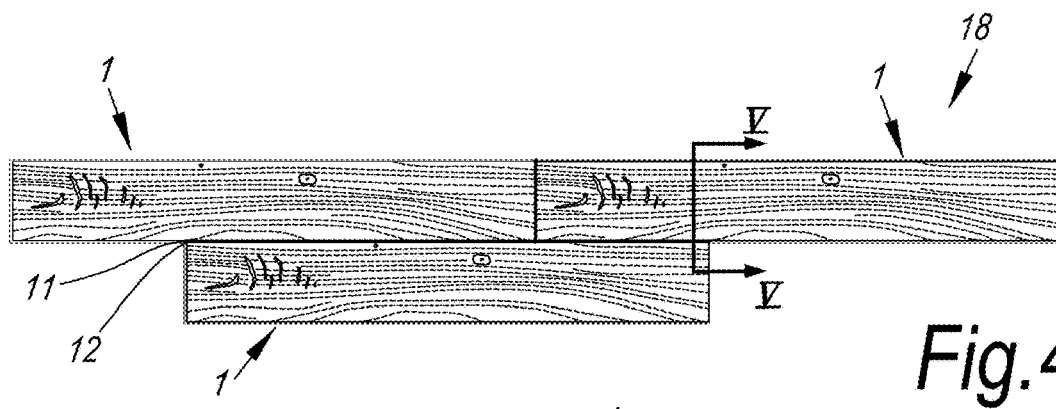
FIG. 4 on a smaller scale shows a top plane view of a floor covering comprising a plurality of the floor elements of FIG. 1.
Figure 5:
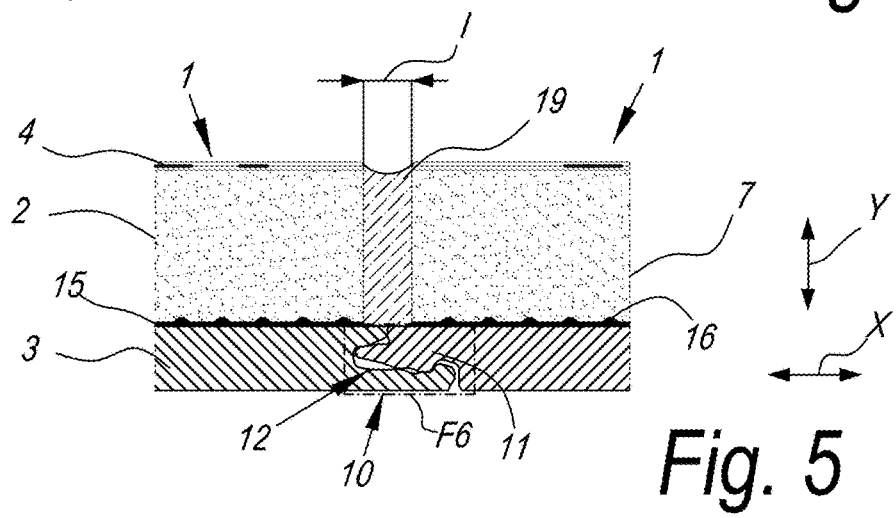
FIG. 5 on a larger scale shows a cross section along the line V-V of FIG. 4.
Figure 6:
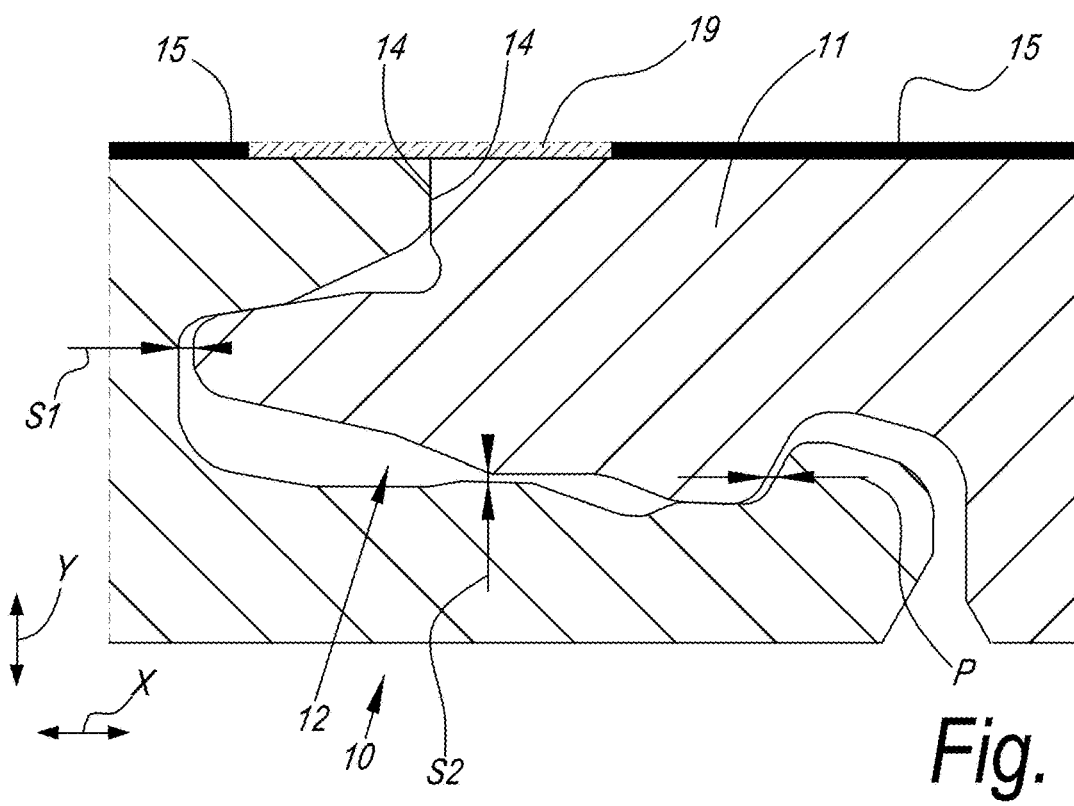
FIG. 6 on a larger scale shows a view on the area F6 indicated on FIG. 5.

With the intention of better showing the characteristics of the invention, in the following, as an example without limitation, several preferred forms of embodiments are described with reference to the accompanying drawings, wherein:

FIG. 1 shows a top view of an embodiment of a floor element of the invention;

FIG. 2 on a larger scale shows a cross section along the line II-II of FIG. 1;

FIG. 3 on a larger scale shows a view on the area F3 indicated on FIG. 2;

FIG. 4 on a smaller scale shows a top plane view of a floor covering comprising a plurality of the floor elements of FIG. 1;

FIG. 5 on a larger scale shows a cross section along the line V-V of FIG. 4;

FIG. 6 on a larger scale shows a view on the area F6 indicated on FIG. 5.

FIG. 1 shows a top view of an embodiment of a floor element 1 according to the invention. The floor element 1 comprises a decorative layer 2 disposed above a support layer 3.

As illustrated, the floor element 1 comprises a rectangular elongated shape. Preferably, the floor element 1 comprises a superficial area of less than 1.5 sqm, preferably less than 1 sqm, more preferably less than 0.4 sqm. For example, the decorative layer 2 comprises edges having a maximum length L of less than 1.5 m, preferably less than 0.9 m.

The decorative layer 1 has an upper face 4 comprising a décor 5. The décor 5 can be provided with a variety of textures, designs and colors. In the illustrated example the décor simulates a wood pattern comprising wood nerves and flakes. Preferably, the décor 5 is at least partially formed by a print 6. The print 6 is preferably realized by means of digital printing, such as inkjet printing, although screen printing, rotogravure, flexography or off-set printing is not excluded.

FIG. 2 on a larger scale shows a cross section along the line II-II of FIG. 1. According to the illustrated example the decorative layer 2 comprises a body 7 made of a ceramic material, for example red body ceramic or porcelain.

The decorative layer 2 comprises a background coating 8 covering at least partially the upper surface of the body 7, for example comprising at least a glaze. The background coating 8 is adapted to receive the décor 5 on its top, for example adapted to receive the print 6 on its top. The background coating 8 can be white, beige, brown or of any color suitable to receive the décor 7 on its top.

The decorative layer 2 further comprises a protective coating 9 covering at least partially the upper surface of the body 7, for example comprising at least a glaze. The protective coating 9 is adapted to be placed above the décor 5 and is transparent or translucent.

FIG. 2 also shows that decorative layer 2 has a thickness T1 comprised between 4 and 15 mm, for example 6 mm, preferably greater than 7 mm, for example 8 or 10 mm.

The support layer 3, according to the example, is made of a polymeric material, preferably a thermoplastic material like PVC. In a preferred embodiment, the support layer is made of a rigid PVC. Within the context of the present description, "rigid" means that the support layer, taken alone, bends under the own weight thereof less than 10 cm per meter and still better less than 5 cm per meter. The support layer 3 may also comprise a high amount of filler materials, such as calcium carbonate, e.g. more than 30 wt % or more than 60% wt of such filler materials.

Moreover, according to a preferred embodiment, the support layer 3 is made of a rigid PVC that may comprise a flexural modulus between 5 and 10 GPa, for example, approximately 8 GPa. The support layer 3 may also comprise a flexural strength between 20 and 90 MPa, for example between 30 and 50 MPa. Preferably, the support layer 3 has a thermal expansion coefficient comprised between 20 µm/m per° C. and 85 µm/m per° C., preferably between 40 µm/m per° C. 60 µm/m per° C.

Furthermore, the support layer 3 preferably has a thickness T2 comprised between 2 and 7 mm, preferably less than 6 mm, more preferably about 4 mm or less.

FIG. 2 also shows that the support layer 3 comprises longitudinal edges 10 provided with first coupling elements 11,12 configured to realize a mechanical coupling with coupling elements 11,12 of an adjacent floor element 1. In the illustrated examples the coupling elements 11,12 comprise a male and female parts disposed on opposite longitudinal edges 10. In a preferred example, the covering element 1 comprises the coupling elements 11,12 on its transversal edges, i.e. on the short edges, and, preferably, said coupling elements 11,12 on the transversal edges are substantially equal to those on the longitudinal edges, i.e. they have the same dimension and/or shape.

The first coupling elements 11,12 of the longitudinal edges 10 are configured for being coupled each other by means of an angling motion around a horizontal axis parallel to the longitudinal edges 10. The male and female parts are respectively shaped in form of a tongue 11 and a groove 12 wherein the tongue 11 projects outwardly beyond its respective longitudinal edge 10 in a horizontal direction X and the groove 12 projects inwardly with respect to the respective longitudinal edge 10 in said horizontal direction.

The support layer 3 extends beyond longitudinal edges 13 of the decorative layer 2. In the example, the support layer 3 comprises upper longitudinal edges 14 that extend beyond the longitudinal edge 13 of the decorative layer 2 of a distance D. For example, but not necessarily, said distance D is equal on both the opposite longitudinal edges 13 of the decorative layer 2. It is to be noted that preferably, the support layer 3 extends beyond the transversal edges of the decorative layer 2, for example of a distance D that is substantially equal to that on the longitudinal edges 10.

FIG. 2 further shows that the floor element 1 comprises an intermediate layer 15 disposed between the decorative layer 2 and the support layer 3. The intermediate layer 15 comprises a resin material, for example a thermosetting resin or thermoplastic resin. Examples of thermosetting resin are epoxy, polyurethane, cyanoacrylate or acrylic resin. Examples of thermoplastic resin are hot melt, polyester thermoplastic, vinyl etc. Preferably the resin is a rigid resin. In particular, according to a preferred embodiment of the invention the intermediate layer comprises an epoxy resin. It is also preferred that the epoxy is a bicomponent resin, i.e.

a thermosetting resin obtained by curing at low temperature (for example at room temperature) a mixture of two components, namely a resin and a hardener.

The resin comprises a modulus of elasticity above 0.1 GPa, preferably, greater than 0.5 GPa, for example greater than 1 GPa. Preferably, the resin comprises a modulus of elasticity between 1 and 1.5 GPa.

It is also preferable that the resin may comprise an elongation at break less than 200%, more preferably less than 150%, even more preferably less than 100%, for example less than 50%. Preferably said elongation at break of the resin may be greater than 1%, preferably greater than 10%.

The resin preferably comprises a tensile strength between 50 and 90 MPa, more preferably between 60 and 80 MPa, for example 75 MPa. Moreover, the resin preferably comprises a compressive strength between 90 and 130 MPa, more preferably between 100 and 120 MPa, for example 110 MPa. It is also preferable that the resin shows a hardness value of at least 50 measured on a Shore D scale.

As illustrated the intermediate layer 15 covers the 100 percent of the lower surface of the decorative layer 2. The resin is preferably provided onto the lower surface of the decorative layer 2 in an amount greater than 150 g/sqm, more preferably greater than 200 g/sqm, for example 220 g/sqm.

In a preferred example illustrated in FIG. 2, the intermediate layer 15 is in direct contact with the upper surface of the support layer 3 so that act as a glue between the decorative layer 2 and the support layer 3.

In the embodiment of FIG. 2 the decorative layer 2 comprises a back surface having a structure, said structure comprises excavations 16 with a depth of less than 0.5 mm, for example between 0 and 0.4 mm. Said excavations 16 are preferably disposed in a pattern having lines running in a longitudinal direction of the decorative layer and they are preferably continuous and with a zig zag shape. FIG. 3 on a larger scale shows a view on the area F3 indicated on FIG. 2. As illustrated in FIG. 3 the decorative layer 2, more in detail the body 7 thereof, comprises, at least in correspondence of its lower surface, an open porosity 17 adapted to be permeated by the resin of the intermediate layer 15.

Thus, according to a preferred embodiment of the invention the decorative layer 2 comprises an apparent porosity between 0.1% and 10% according to ASTM C373, more preferably between 2% and 8%, for example 6%. Furthermore, the decorative layer may preferably have a volume of the open pores 14 comprised between 0.01 cc (cubic centimeter) and 1 cc, more preferably between 0.10 cc and 0.90 cc, for example 0.60 cc.

Therefore, in order to properly flow into said open pores 17 the resin comprises a viscosity at 20° C. less than 1000 mPas, preferably less than 800 mPas, more preferably less than 600 mPas, for example approximately 400 mPas. Within the scope of the invention viscosity means the viscosity of the uncured resin, for example the viscosity of the mixture of the two components before the completion of the curing, i.e. during the so-called pot life.

FIG. 4 is a top plane view of a floor covering 18 comprising a plurality of floor elements 1 coupled by means of the first coupling elements 11,12 along the longitudinal edges 10 and the transversal edges.

FIG. 5 on a larger scale shows a cross section along the line VI-VI of FIG. 4. The floor covering 18 comprises a grout 19 filling an intermediate distance I separating the decorative layers 2 of the floor elements 1. According to the illustrated example, the intermediate distance I is twice the distance D between the upper edge of the support layer 3 and the edge of the decorative layer 3. It is to be noted that the intermediate distance I is not necessarily twice the distance D although it depends on said distance. Preferably said intermediate distance I is 2 or 3 mm.

Preferably a polymeric and/or cement-based grout 19 is used. The grout 19 may be a flexible or rigid grout. A flexible grout may be for example a silicone-based grout whereas a rigid grout may be for example an epoxy-based grout or cement-based grout. Epoxy-based, and silicone-based are example of polymeric grout, other examples of polymeric grout are polyurethane-based or acrylic-based grout.

In a preferred embodiment, the grout can show a compressive strength greater than 20 MPa, for example comprised between 24 and 60 MPa. Preferably, the grout can show a hardness Shore A greater than 70, for example between 80 and 90.

FIG. 5 further shows a section of the mechanical coupling between the coupling elements 11,12 along a plane transversal to the longitudinal edges 10.

FIG. 6 on a larger scale shows a view on the area F6 indicated on FIG. 5. According to a preferred example illustrated in FIG. 7, in the coupled condition, of FIG. 7, between the tongue 11 and the groove 12 is formed a horizontal play P that allows tiny horizontal movement of the tongue 11 into the groove 12.

Preferably, said play P is greater than 0.01 mm, preferably greater than 0.03 mm. Moreover, said play P is preferably less than 0.10 mm, for example less than 0.08 mm.

FIG. 7 also shows that in said coupled condition, between the tongue 11 and the groove 12 is established a horizontal inoperative space S1 and a vertical inoperative space S2.

It is noted that in the coupled condition the tongue 11 and the groove 12 are in an undeformed condition. Further, the whole angling movement that allows the coupling between the tongue 11 and the groove 12 occur without deformation of the first coupling elements 11,12. In fact due to the play P and the inoperative spaces S1, S2 the coupling between the tongue 11 and the groove 12 is significantly simplified.

Further, as is clear from the content of the description, the present invention relates to one or more of the items as listed below, numbered from 1 to 20:

1.—A floor element for forming a floor covering, the floor element comprising a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element and wherein the resin material has a modulus of elasticity greater than 0.1 GPa, preferably greater than 0.5 GPa, even more preferably greater than 1 GPa.

2.—The floor element according to item 1, wherein the resin material comprises epoxy.

3.—The floor element according to any of the preceding items, wherein the resin material permeates a lower surface of the decorative layer 4.—The floor element according to any of the preceding items, wherein the resin material has a viscosity less than 1000 mPas at 20° C.

5.—The floor element according to any of the preceding items, wherein the resin material has an elongation at break less than 200%, more preferably less than 150%, even more preferably less than 100%, for example less than 50%.

6.—The floor element according to any of the preceding items, wherein the resin material has an elongation at break greater than 1%, preferably greater than 10%.

7. The floor element according to any of the preceding items, wherein the resin material has a tensile strength between 50 and 90 MPa, more preferably between 60 and 80 MPa, for example 75 MPa.

8.—The floor element according to any of the preceding items, wherein the resin material has a compressive strength between 90 and 130 MPa, more preferably between 100 and 120 MPa, for example 110 MPa.

9.—The floor element according to any of the preceding items, wherein the resin material has a hardness value of at least 50 measured on a Shore D scale.

10.—The floor element according to any of the preceding items, wherein the intermediate layer covers 80 percent or more of the lower surface of the decorative layer.

11.—The floor element according to any of the preceding items, wherein the intermediate layer has a resin content of at least 150 g/sqm.

12.—The floor element according to any of the preceding items, wherein the intermediate layer is an adhesive layer that bonds together the decorative layer and the support layer.

13.—The floor element according to any of the preceding items, wherein the decorative layer has a back face comprising excavations, said excavations having a depth less than 0.6 mm.

14.—The floor element according to any of the preceding items, wherein the support layer comprises rigid PVC.

15.—The floor element according to any of the preceding items, wherein the support layer has a flexural modulus between 5 and 10 GPa.

16.—The floor element according to any of the preceding items, wherein the support layer has a thickness greater than 6 mm.

17.—A floor covering comprising a plurality of floor elements according to any of the preceding items.

18.—A floor element for forming a floor covering, wherein the floor element comprises a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element and wherein the resin material comprises an elongation at break less than 200%, more preferably less than 150%, even more preferably less than 100%, for example less than 50%; and/or an elongation at break greater than 1%, preferably greater than 10%.

19.—The floor element according to any of the preceding items, wherein said resin material comprises a modulus of elasticity greater than 0.1 GPa, preferably greater than 0.5 GPa, even more preferably greater than 1 GPa.

20.—A floor covering comprising a plurality of floor elements according to any of the items 18 or 19.

21.—A floor element for forming a floor covering, wherein the floor element comprises a decorative layer comprising a ceramic material, an intermediate layer comprising a resin material, and a support layer arranged below the decorative layer, wherein the support layer comprises edges provided with coupling elements configured to realize a mechanical coupling with coupling elements of an adjacent floor element and wherein the support layer comprises a material that has a flexural modulus above 5 GPa and/or a flexural strength between 20 and 90 MPa.

22.—The floor element according to item 21, wherein the support layer comprises a thermoplastic material, preferably rigid PVC.

23.—The floor element according to item 21 or 22, wherein the support layer comprises between 50 and 75% weight of filler, preferably mineral particles.

The present invention is in no way limited to the hereinabove described embodiments, but such floor elements may be realized according to different variants without leaving the scope of the present invention.

What is claimed is:

1. A floor element for forming a floor covering, the floor element comprising:
    a decorative layer comprising a ceramic material;
    an intermediate layer comprising a resin material; and
    a support layer arranged below the decorative layer,
    wherein the support layer comprises edges provided with coupling elements configured to realize a mechanical coupling with coupling elements of an adjacent floor element, and
    wherein the support layer further comprises a material that has a flexural modulus above 5 GPa and/or a flexural strength between 20 and 90 MPa.

2. The floor element according to claim 1, wherein the support layer comprises a thermoplastic material.

3. The floor element according to claim 1, wherein the support layer comprises between 50 and 75% weight of a filler.

4. The floor element according to claim 1, wherein said resin material has a modulus of elasticity above 0.1 GPa.

5. The floor element according to claim 1, wherein the resin material comprises epoxy.

6. The floor element according to claim 1, wherein the resin material permeates a lower surface of the decorative layer.

7. The floor element according to claim 1, wherein the resin material has a viscosity at 20° C. less than 1000 mPas.

8. The floor element according to claim 1, wherein the resin material has a tensile strength between 50 and 90 MPa.

9. The floor element according to claim 1, wherein the resin material has a compressive strength between 90 and 130 MPa.

10. The floor element according to claim 1, wherein the resin material has a hardness value of at least 50 measured on a Shore D scale.

11. The floor element according to claim 1, wherein the intermediate layer covers 80 percent or more of the lower surface of the decorative layer.

12. The floor element according to claim 1, wherein the intermediate layer comprises a resin content of at least 150 g/sqm.

13. The floor element according to claim 1, wherein the intermediate layer is an adhesive layer that bonds the decorative layer and the support layer together.

14. The floor element according to claim 1, wherein the support layer comprises rigid polyvinyl chloride (PVC).

15. The floor element according to claim 1, wherein the support layer has a thickness less than 6 mm.

16. The floor element according to claim 1, wherein the support layer has a flexural modulus between 5 and 10 GPa.

17. The floor element according to claim 1, wherein the decorative layer has a back-face comprising excavations, said excavations having a depth less than 0.6 mm.

18. A floor covering comprising a plurality of floor elements according to claim 1.

* * * * *